United States Patent
Benthin

(10) Patent No.: US 7,079,603 B1
(45) Date of Patent: Jul. 18, 2006

(54) METHOD FOR CORRELATING CHRONOLOGICALLY DISCRETE SIGNAL SEGMENTS

(75) Inventor: Marcus Benthin, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 693 days.

(21) Appl. No.: 10/089,208

(22) PCT Filed: Sep. 26, 2000

(86) PCT No.: PCT/DE00/03342

§ 371 (c)(1),
(2), (4) Date: Mar. 26, 2002

(87) PCT Pub. No.: WO01/35542

PCT Pub. Date: May 17, 2001

(30) Foreign Application Priority Data

Nov. 10, 1999 (DE) .................................. 199 53 895

(51) Int. Cl.
*H04D 1/00* (2006.01)
*H04J 3/06* (2006.01)

(52) U.S. Cl. .................. 375/342; 375/343; 370/509

(58) Field of Classification Search ............... 375/343, 375/316, 328, 329, 342; 370/206, 506
See application file for complete search history.

(56) References Cited

U.S. PATENT DOCUMENTS 5,592,227 A * 1/1997 Feng ..................... 374/240.14
5,726,984 A * 3/1998 Kubler et al. ................ 370/349
5,727,004 A * 3/1998 Propp et al. ................. 714/798
6,498,791 B1 * 12/2002 Pickett et al. ............... 370/353
6,625,239 B1 * 9/2003 Shiraishi et al. ............ 375/354
6,731,673 B1 * 5/2004 Kotov et al. ................. 375/145

FOREIGN PATENT DOCUMENTS

EP 0 565 506 A 10/1993
EP 0 676 874 A 10/1995

OTHER PUBLICATIONS

Matsuoka, H, "Adaptive modulation system with variable coding rate concatenated code for high quality multi-media communication systems", Vehicular Technology Conference, 1996, IEEE 46th vol. 1, Apr. 28-May 1, 1996 pp. 487-491.*

H.D.Luecke: "Korrelationssignale". Springer-Verlag Berlin, Heidelberg, New York . . . 1992 pp. 114-116, 190-191 (with english translation).

* cited by examiner

Primary Examiner—Jean B. Corrielus
Assistant Examiner—Qutub Ghulamali
(74) Attorney, Agent, or Firm—Michael J. Striker

(57) ABSTRACT

The method determines the position of a predetermined known signal segment in a transmitted signal received in a receiver by means of a correlation between the received signal and a representation of the known signal segment stored in the receiver. The known signal segment is stored in the receiver as an erroned hierarchical sequence that is the sum of a hierarchical sequence and an error sequence. The correlation is formed as a sum of a correlation between the received signal and the stored hierarchical sequence and a correlation between the received signal end the stored error sequence.

5 Claims, 2 Drawing Sheets

METHOD FOR CORRELATING CHRONOLOGICALLY DISCRETE SIGNAL SEGMENTS

BACKGROUND OF THE INVENTION

The present invention relates to a method for correlating discrete-time signal segments, wherein a predetermined signal section in a signal is determined by means of the correlation, in particular for a signal transmission system, wherein the system having the known signal segment is sent from a transmitter to a receiver, and the position of the known signal segment in the signal is determined in the receiver by means of the correlation between the received signal and the known signal segment.

Although usable in any digital message transmission system, the present invention as well as its underlying problems will be explained in relation to UMTS (Universal Mobile Telephone Systems) systems.

To detect a known signal segment (also referred to hereinafter as "test signal") in a received signal, the correlation of the test signal that is known and stored there with the received signal is usually carried out in the receiver.

This position determination of the test signal serves, for example, to determine the starting instant of the test signal within the received signal, i.e., for purposes of synchronization.

Of particular interest hereby are test signals that have good autocorrelation properties that are noted for a high autocorrelation coefficient in the relative time shift zero and, additionally, for low values for the autocorrelation to time shifts different from zero.

Moreover, these test signals should have a systematic structure that makes it possible to carry out the necessary correlations with the fewest arithmetic operations possible. A special class of discrete-time test signals in this sense form "hierarchical codes" or sequences.

A hierarchical sequence h(k) of the nth order is formed systematically out of n not necessarily different short sequences $$\underline{h}_1=(h_1(0),h_1(1),\ldots,h_1(m_1-1)),\underline{h}_2=(h_2(0),h_2(1),\ldots,h_2(m_2-1)),\ldots,\underline{h}_n=(h_n(0),h_n(1),\ldots,h_n(m_n-1))$$

having elements $h_i(k)\in\{-1, +1\}$, according to the following construction scheme:

$$x_1(k)=h_1(k), k=0,\ldots,m_1-1, \quad (1)$$

$$x_{i+1}(k)=h_{i+1}(k \text{ div } m_{i+1})\cdot x_i(k \text{ mod } m_i),$$

$$k = 0, \ldots, \left(\prod_{l=1}^{i+1} m_l\right) - 1, i = 1, \ldots, n-1 \quad (2)$$

$$h(k) = x_n(k), k = 0, \ldots, \left(\prod_{l=1}^{n} m_l\right) - 1. \quad (3)$$

The expense to correlate such a hierarchical sequence with another signal or another sequence can be reduced considerably in known fashion by means of a rapid correlation in multiple steps, as compared to a direct realization. Moreover, hierarchical sequences can be found that have good correlation properties and are therefore well-suited in the sense mentioned initially as test signals for synchronization.

The mentioned procedure for the cost-efficient, rapid hierarchical correlation will be explained further hereinafter, because the method according to the invention described later is based on it. The received signal, with which the test signal is to be correlated in the receiver, is referred to as s(k). Without restricting the generality, it suffices to consider hierarchical sequences of the $2^{nd}$ order (i.e., n=2), because hierarchical sequences having more than two hierarchical levels are always formed successively out of two subsequences, according to the above equations. The correlation should be carried out for each instant k.

The correlation result v(k) is thereby as follows:

$$v(k) = \sum_{j=0}^{n-1} h(j)\cdot s(j+k) \quad (4)$$

$$= \sum_{j=0}^{n-1} h_2(j \text{ div } m_2)\cdot h_1(j \text{ mod } m_1)\cdot s(k+j)$$

$$= \sum_{i=0}^{n_2-1} h_2(i)\cdot \underbrace{\sum_{j=0}^{n_1-1} h_1(j)\cdot s(k+i\cdot n_1+j)}_{v_1(k+i\cdot n_1):=} \quad (5)$$

$$= \sum_{i=0}^{n_2-1} h_2(i)\cdot \sum_{j=0}^{n_1-1} v_1(k+i\cdot n_1)$$

FIG. 2 illustrates the known hierarchical correlation procedure using the example of a hierarchical sequence of the $2^{nd}$ order. The arithmetic steps are illustrated using lines.

The short subsequences are given by $\underline{h}_1=(+1, +1, -1, +1)$ and $\underline{h}_2=(+1, -1, +1, +1)$. The total sequence is therefore $\underline{h}=(+1, +1, -1, +1, -1, -1, +1, -1, +1, +1, -1, +1, +1, +1, -1, +1)$. In the first step or the first subcorrelation step TK1, the subcorrelation $v_1(k)$ is determined. In the second step or the second subcorrelation step TK2, the searched-for correlation v(k) is determined from this intermediate result. As time k continues, as indicated in FIG. 2 using the bold lines, three known results can be referred back to in each case, and only one new calculation need be carried out in the subcorrelation step TK1, namely for the most recent ones, by the sampling of received signal values of the signal s(k).

Further correlation steps result accordingly for n>2 subsequences according to the same basic principle.

SUMMARY OF THE INVENTION

The problem underlying the present invention is basically that the known method is to be expanded to non-hierarchical sequences without the computer power becoming too great for the correlation.

The basic idea underlying the present Invention is that the known rapid multi-level correlation procedure of the above-described kind, especially for representing signal segments of a mobile phone signal, using hierarchical sequences is expanded to include erroned hierarchical sequences.

An erroned hierarchical sequence h̃ is to be described as a sequence, the construction of which is not immediately possible by means of decomposition into suitable subsequences, but a hierarchical sequence $\underline{h}$ can be found that is very similar to the sequence. The difference between $\underline{h}$ and h̃ is described by a further sequence referred to hereinafter as error sequence $\underline{h}_e$. The decomposition of h̃ into $\underline{h}$ and $\underline{h}_e$ should be selected such that the necessary number of arithmetical operations for the correlation is reduced overall to the greatest extent possible.

In the method according to the invention, therefore, correcting expressions are also taken into consideration in addition to a hierarchical correlation to calculate the correlation v(k). The method according to the invention is therefore to be referred to as a "corrected hierarchical correlation".

The method according to the invention of corrected hierarchical correlation is usable on sequences that cannot be decomposed themselves directly, but for which a suitable representation as sum of a hierarchical sequence and an error sequence can be found.

The sequence presented further below in the exemplary embodiment is usable as subsequence for generating a hierarchical sequence for the Universal Mobile Telecommunication System (UMTS) for purposes of synchronization. The method according to the invention now allows for the further decomposition of this subsequence according to a corrected hierarchical structure, so that the necessary computer power for determining the correlation can be reduced by a further 40% approximately. Since the numerical expense for the synchronization of a mobile station with a base station makes up a significant portion of the baseband computer power in the mobile station overall, the method according to the invention is very useful in reducing the computer power required.

Reduced computer power in the baseband signal processing means, on the one hand, lower costs for the baseband hardware (lower clock rate, fewer logic gates, etc.). On the other hand, lower computer power also leads to reduced power input of the baseband hardware, so that extended speech or stand-by times can be made possible for mobile stations in particular that are operated using storage cells.

Advantageous further developments and improvements of the method according to the invention are presented in the appended subclaims.

According to a preferred further development, the erroned hierarchical sequence $\tilde{h}$ is representable as follows by the hierarchical sequence $\underline{h}$ and the error sequence $\underline{h}_e$:

$$\tilde{h}(k)=h(k)+h_e(k), k=0,\ldots,m-1 \quad (6)$$

wherein m is a natural number and describes the length of the sequences $\tilde{h}$, $\underline{h}$ and $\underline{h}_e$, and wherein the elements of the sequences $\tilde{h}$ and $\underline{h}$ are from the range of values $\{-1, +1\}$ and the elements of $\underline{h}_e$ are from the range of values $\{-2, 0, +2\}$.

According to a further preferred further development, the correlation v(k) of $\tilde{h}$ with the signal s(k) is described by:

$$v(k) = \sum_{j=0}^{m-1} \tilde{h}(j)\cdot s(k+j) = \sum_{j=0}^{m-1} [h(j)+h_e(j)]\cdot s(k+j) \quad (7)$$

$$= \underbrace{\sum_{j=0}^{m-1} h(j)\cdot s(k+j)}_{u(k):=} + \underbrace{\sum_{j=0}^{m-1} h_e(j)\cdot s(k+j)}_{u_e(k):=} \quad (8)$$

wherein u(k) is the correlation between the signal s(k) and the stored hierarchical sequence, and $u_e(k)$ is the correlation between the signal s(k) and the stored error sequence.

The first addend u(k) can be calculated directly using the rapid hierarchical correlation based on the hierarchical construction of $\underline{h}$. For the second addend $u_e(k)$, the further procedure depends on the structure of $\underline{h}_e$.

According to a further preferred further development, the decomposition into the sum of a hierarchical sequence and an error sequence is carried out in such a fashion that the error sequence contains elements that differ from zero as little as possible. Advantageously, a decomposition of $\tilde{h}$ into $\underline{h}$ and $\underline{h}_e$ is such that $\underline{h}_e$ contains as few elements as possible that differ from zero.

For the case in which $\underline{h}_e$ contains, for example, only one element, $h_e(K)=\beta$, different from zero ($\beta\in\{-2, +2\}$), the calculation of $u_e(k)$ simplies to $u_e(k)=\beta\cdot s(k+K)$, so that this follows:

$$v(k)=u(k)+\beta\cdot s(k+K) \quad (9)$$

If there is more than one element different from zero, correspondingly more correction terms are to be taken into consideration. In the general case, a method for calculating correlation expressions can also be used again to calculate the expression $U_e(k)$.

According to a further preferred embodiment, the method is used in a mobile telephone system.

BRIEF DESCRIPTION OF THE DRAWING

An exemplary embodiment of the invention is presented in the drawings and described in greater detail in the subsequent description.

DETAILED DESCRIPTION OF THE
EXEMPLARY EMBODIMENTS

Figure 1:
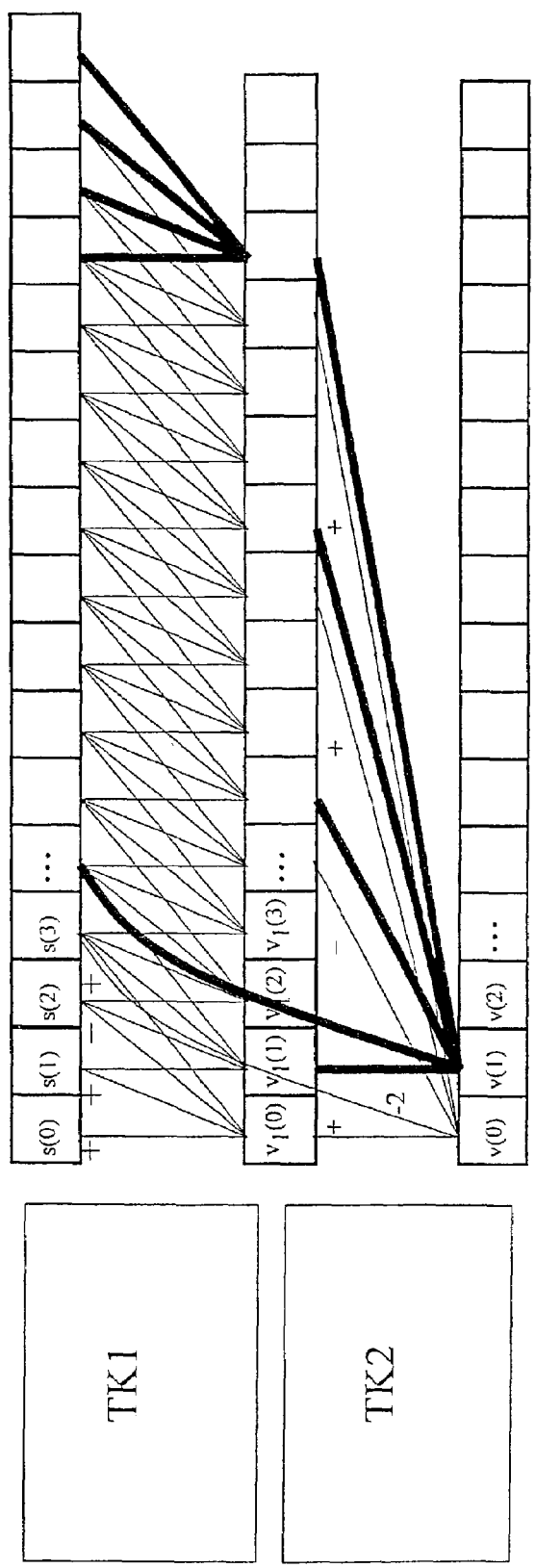
FIG. 1 shows an erroned hierarchical correlation procedure having a hierarchical sequence of the $2^{nd}$ order and a simple error sequence as exemplary embodiment of the present invention.

Referring to FIG. 1, an exemplary embodiment of the method according to the invention corresponding to an erroned hierarchical correlation procedure having a hierarchical sequence of the $2^{nd}$ order and a simple error sequence is explained hereinafter.

The sequence presented in the exemplary embodiment has been proposed as a subsequence for generating a hierarchical sequence for the Universal Mobile Telecommunication System (UMTS) for purposes of synchronization.

The following Lindner sequence is considered (refer also to H. D. Lüke, Korrelationssignale [Correlation Signals], Springer Verlag, Berlin, Heidelberg, New York, 1992):

$$\tilde{h}=(+1, +1, -1, +1, -1, -1, +1, -1, +1, +1, -1, +1,$$
$$+1, +1, -1, +1),$$

which apparently cannot be decomposed directly into suitable hierarchical subsequences so that the known hierarchical correlation—favorable in terms of expense—can be used. As an alternative, however, it can be represented using a hierarchical sequence and an error sequence according to $$\tilde{h}(k)=h(k)+h_e(k), k=0,\ldots,m-1 \quad (10)$$

with $\underline{h}=(+1, +1, -1, +1, -1, -1, +1, -1, +1, +1, -1, +1, +1, +1, -1, +1)$ and $\underline{h}_e=(0, 0, 0, -2, 0, 0, 0, 0, 0, 0, 0, 0, 0, 0, 0, 0)$.

A hierarchical decomposition of $\underline{h}$ is given by the subsequences $\underline{h}_1=(+1, +1, -1, +1)$ and $\underline{h}_2=(+1, -1, +1, +1)$.

The correlation procedure overall can therefore take place advantageously using the method according to the invention by means of the corrected hierarchical correlation.

Figure 2:
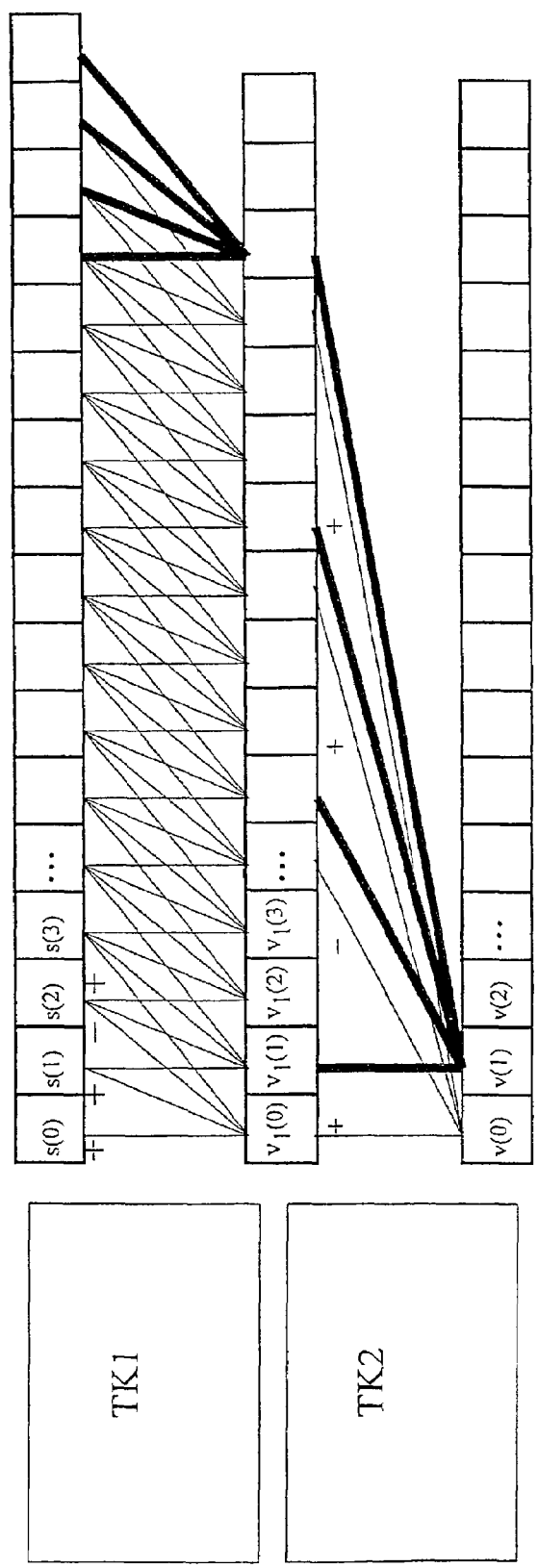
FIG. 2 shows the known hierarchical correlation procedure using the example of a hierarchical sequence of the $2^{nd}$ order.

FIG. 1 illustrates this procedure. In addition to the structure of the hierarchical correlation known from FIG. 2, combinations of received signal s(k) to the result of the second subcorrelation step TK2 are to be seen that represent the correction terms in the form of values of the input signal weighted with −2.

A consideration of the expense for the entire correlation is carried out hereinafter. A direct realization of the correlation of the sequence h̃ (the length of m elements) using a sequence of, in general, complex variables s(k), requires a number of m complex additions for each correlation value v(k) to be determined. With m=16, that is 16 complex additions in this example.

The splitting into the hierarchical sequence and the error sequence reduces this number significantly. Four complex additions per correlation value v(k) are required for the hierarchical correlation in the first step, and 4 are also required in the second step. In addition, there is the multiplication of the value s(k+3) by the factor −2 and the addition of this correction value to the result of the hierarchical correlation, as indicated in FIG. 1. If one takes into consideration the fact that the multiplication by 2 corresponds to a bit shift of one place and therefore requires a negligibly small amount of computer power as compared to a "real" multiplication, the only thing remaining, notably, is to incorporate the one additional complex addition by the correction value into the correlation result. Using the corrected hierarchical correlation, therefore, the entire correlation procedure requires 9 complex additions per correlation value v(k) as compared to the 16 complex additions mentioned hereinabove in the direct realization of the correlation. This represents a savings of a good 40%.

The method presented has a very high level of actuality with regard for the current worldwide intensive research and development activities of all manufacturers of mobile radio equipment involving third-generation mobile radio systems (UMTS, etc.).

Although the present invention was described hereinabove using a preferred exemplary embodiment, it is not limited to that. Instead, it is modifiable in multiple fashions.

In particular, the invention is not limited to UMTS (Universal Mobile Telephone Systems) systems. Instead, it is usable with any digital, discrete-time signal processing system.

The invention claimed is:

1. A method of correlating discrete-time signal segments, said method comprising the steps of:
 a) providing a signal for transmission from a transmitter to a receiver, said signal including a predetermined signal section; and
 b) storing the predetermined signal section in the receiver as an erroned hierarchical sequence h̃, wherein said erroned hierarchical sequence h̃ is represented by a hierarchical sequence h̲ and an error sequence h̲$_e$ as follows:

$$\tilde{h}(k)=h(k)+h_e(k), k=0,\ldots,m-1,$$

wherein m is a natural number and defines a length of the sequences, h̃, h̲ and h̲$_e$, and wherein elements of h̃ and h̲ have a range of values: {−α, +α} and elements of h̲$_e$ have a range of values: {−2α, 0, +2α}, wherein α represents any real or complex number;
 c) correlating the erroned hierarchical sequence h̃ stored in step b) with a received signal received in the receiver to determine a position of the predetermined signal section in the received signal, said correlating comprises forming a sum of a correlation between the received signal and said hierarchical sequence h̲ and a correlation between the received signal and said error sequence h̲$_e$.

2. The method as defined in claim 1, further comprising decomposing the erroned hierarchical sequence h̃ into a sum of the hierarchical sequence h̲ and the error sequence h̲$_e$ so that the error sequence h̲$_e$ contains as few of said elements as possible that are different from zero.

3. A method of correlating discrete-time signal segments, said method comprising the steps of:
 a) providing a signal for transmission from a transmitter to a receiver, said signal including a predetermined signal section; and
 b) storing the predetermined signal section in the receiver as an erroned hierarchical sequence h̃, wherein said erroned hierarchical sequence h̃ is represented by the hierarchical sequence h̲ and the error sequence h̲$_e$ as follows:

$$\tilde{h}(k)=h(k)+h_e(k), k=0,\ldots,m-1,$$

wherein m is a natural number and defines a length of the sequences, h̃, h̲ and h̲$_e$ and wherein elements of h̃ and h̲ have a range of values: {−α, +α} and elements of h̲$_e$ have a range of values: {−α, +α}, wherein α represents any real or complex number;
 c) correlating the erroned hierarchical sequence h̃ stored in step b) with a received signal received in the receiver to determine a position of the predetermined signal section in the received signal, said correlating comprises forming a sum of a correlation between the received signal and said hierarchical sequence h̲ and a correlation between the received signal and said error sequence h̲$_e$;
 wherein a correlation v(k) of said erroned hierarchical sequence h̃ with the received signal s(k) is given by $$v(k)=\sum_{j=0}^{m-1}\tilde{h}(j)\cdot s(k+j)=\sum_{j=0}^{m-1}[h(j)+h_e(j)]\cdot s(k+j)$$
$$=u(k)+u_e(k)$$

wherein u(k)=the correlation between the hierarchical sequence h̲ and the received signal s(k) and $$u(k)=\sum_{j=0}^{m-1}h(j)\cdot s(k+j); \text{ and}$$

wherein u$_e$(k)=the correlation between the error sequence h̲$_e$ and the received signal s(k) and $$u_e(k)=\sum_{j=0}^{m-1}h_e(j)\cdot s(k+j).$$

4. The method as defined in claim 3, further comprising decomposing the erroned hierarchical sequence h̃ into a sum of the hierarchical sequence h̲ and the error sequence h̲$_e$ so that the error sequence h̲$_e$ contains as few of said elements as possible that are different from zero.

5. The method as defined in claim 1 or 3, wherein said signal transmission system is a mobile telephone system.

* * * * *